United States Patent
Kammerloher

(10) Patent No.: US 7,484,453 B2
(45) Date of Patent: Feb. 3, 2009

(54) PRE-MASHER

(75) Inventor: Helmut Kammerloher, Freising (DE)

(73) Assignee: Anton Steinecker Maschinenfabrik GmbH, Freising/Attaching (DE)

( * ) Notice: Subject to any disclaimer, the term of this patent is extended or adjusted under 35 U.S.C. 154(b) by 491 days.

(21) Appl. No.: 10/501,436

(22) PCT Filed: Dec. 12, 2002

(86) PCT No.: PCT/EP02/14173

§ 371 (c)(1),
(2), (4) Date: Dec. 30, 2004

(87) PCT Pub. No.: WO03/062366

PCT Pub. Date: Jul. 31, 2003

(65) Prior Publication Data

US 2005/0103199 A1    May 19, 2005

(30) Foreign Application Priority Data

Jan. 24, 2002   (EP) .................................. 02001698

(51) Int. Cl.
*C12C 11/00*   (2006.01)
(52) U.S. Cl. ..................... 99/276; 99/278; 366/165.2
(58) Field of Classification Search .................. 99/276, 99/277, 277.1, 277.2, 278; 366/165.1, 165.2, 366/165.5
See application file for complete search history.

(56) References Cited

U.S. PATENT DOCUMENTS

| | | | | |
|---|---|---|---|---|
| 185,702 A * | 12/1876 | Schafaus | ...................... | 99/276 |
| 1,960,030 A * | 5/1934 | Sackett | ...................... | 366/104 |
| 2,071,846 A * | 2/1937 | Lamb et al. | ................. | 118/303 |
| 3,585,045 A | 6/1971 | Lenz | | |
| 4,108,052 A * | 8/1978 | Cunningham | ................. | 99/275 |
| 4,182,228 A * | 1/1980 | Redl et al. | ..................... | 99/276 |
| 4,390,284 A * | 6/1983 | Hyde et al. | .............. | 366/165.5 |

FOREIGN PATENT DOCUMENTS

| | | |
|---|---|---|
| CH | 1306 A | 10/1889 |
| CH | 42888 A | 3/1909 |
| DE | 1222454 | 4/1962 |
| DE | 2808712 A | 9/1979 |
| DE | 10026723 A1 | 12/2001 |
| FR | 1539300 A | 9/1968 |

OTHER PUBLICATIONS

Database WPI, Section CH, Week 199049, Derwent Publications Ltd., London, no date.

* cited by examiner

*Primary Examiner*—Reginald L Alexander
(74) *Attorney, Agent, or Firm*—Marshall, Gerstein & Borun LLP

(57) ABSTRACT

A premasher (1, 100) for beer brewing processes, having a downpipe (2) for a stream of grist and an inlet opening (9) for mash water which opens into the downpipe (2). In order to improve the mixing degree of mash water and grist, the inlet opening (9) has associated therewith a turbulence-generating flow guide means (15, 25).

11 Claims, 4 Drawing Sheets

PRE-MASHER

REFERENCE TO RELATED APPLICATIONS

This disclosure claims the benefit of the filing date of International Application No. PCT/EP02/14173, having an international filing date of Dec. 12, 2002, which designated the United States of America, and this disclosure is the United States national stage of that international application. This disclosure further claims priority to European patent application EP 02001698.6, filed Jan. 24, 2002.

1. Field of the Invention

The invention relates to premasher used for beer brewing.

2. Background of the Invention

In beer brewing processes, the rough-ground malt must be mixed with water, i.e. mashed, so as to convert insoluble substances, such as in particular starch, into soluble substances, in particular sugar. For obtaining a good yield and in order to allow unproblematic further processing, it must be guaranteed that the grist is mixed completely with water and that the formation of clots is prevented. In addition, there is the problem of very intensive dust formation, primarily in cases where grist and water are fed into the mash tub via a downpipe. The fine dust rising in the course of this process adheres to structural components and, together with water vapour, it forms sticky residues that can only be removed with great effort, especially in cases in which a so-called powder grist containing an extremely high percentage of powder is used, this type of grist being obtained e.g. from a hammer mill. Hence, so-called premashers are already used nowadays; up to now, such premashers have only been composed of a downpipe which serves to feed the grist and which is attached to the top of the mash tub, and of a water inlet opening, so that the grist and the water can already be brought into contact with one another in the downpipe before they enter the actual mash tub. The water is fed through an inlet opening, which is either provided at the center of the downpipe or extends in the form of an annular opening through the wall of said downpipe. The water is thus discharged substantially radially to the downpipe, immediately after having left the inlet opening, but, due to the flow velocity of the grist in the downpipe, it is then deflected in the form of a parabola in the direction of the flow of grist. However, it turned out that not even the use of this premasher resulted in an optimum mixing degree between water and grist, since the grist was enveloped by a kind of water veil and since this had effect that the grist and the water were not thoroughly mixed.

It is therefore the object of the present invention to improve the mixing degree of grist and mash water.

SUMMARY OF THE INVENTION

It was possible to find out that, on the basis of the turbulences produced in accordance with the present DISCLOSURE, the mixing degree of grist and mash water increases extremely and that dust formation does not take place, not even if hammer-mill grist containing a high percentage of powder is used.

Turbulences are preferably produced by a tangential component of the mash water. In this way, a certain rotational flow is superimposed on the radial flow, with the rotational flow causing in a particularly effective manner higher relative speeds between the grist and the mash water, whereby the mixing degree is markedly increased and the dust particles are bound immediately.

The tangential component is produced in a structurally simple way by deflector surfaces.

Furthermore, measures can be provided, which influence the flow velocity of the grist and of the water. One of these possibilities is, for example, a reduction of the width of the flow cross-section of the downpipe; said reduction of width can be effected by certain measures described in the disclosure and rotational interference elements which act to intensify the turbulences still further.

Another measure is seen in that the inlet opening for the mash water is implemented as a nozzle in such a way that the speed of the mash water is increased above an average speed.

An increase in speed and the resultant suction effect can additionally be supported by the displacer for the grist, which is provided in the area of the inlet opening for the mash water.

BRIEF DESCRIPTION OF THE DRAWINGS

In the following, embodiments of the present invention will be explained making reference to the drawings, in which.

DETAILED DESCRIPTION

Figure 1:
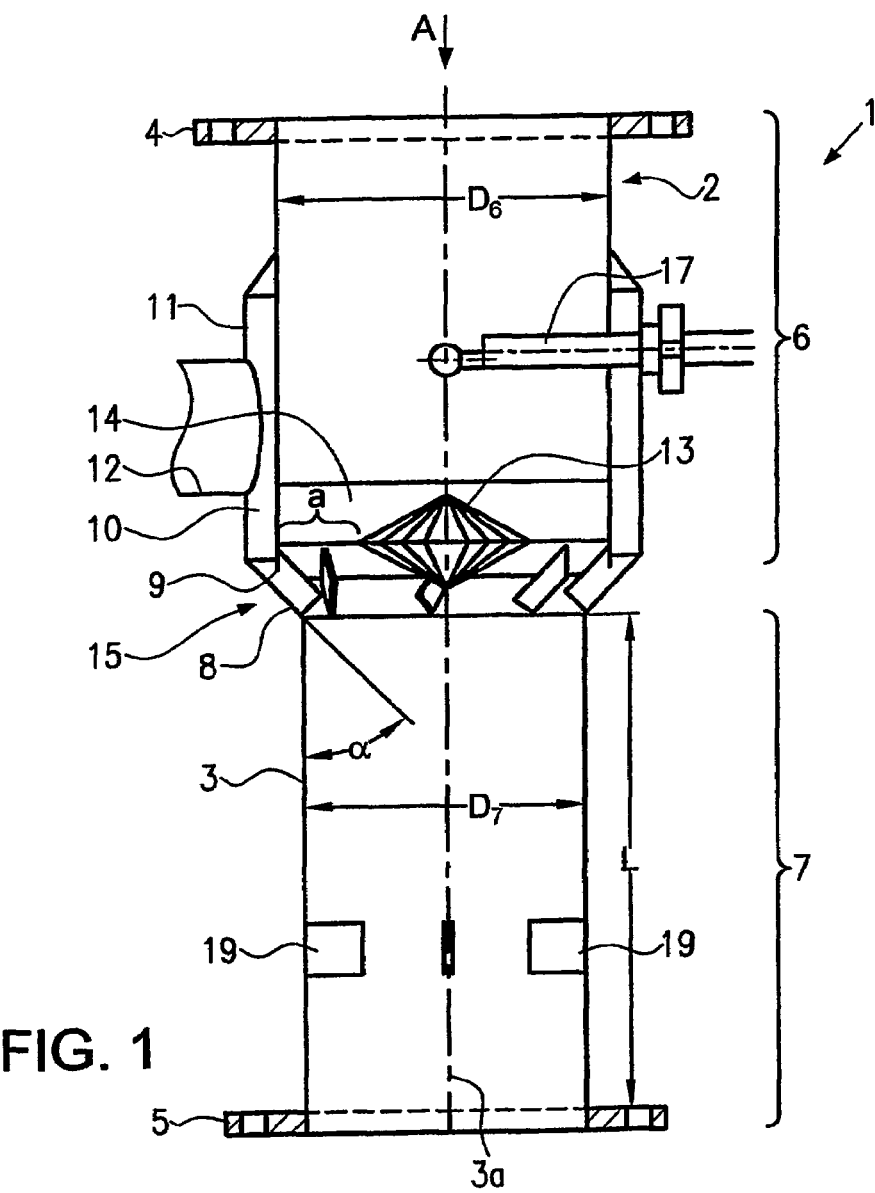
FIG. 1 shows a schematic representation of a first embodiment of a premasher according to the present disclosure in a longitudinal section.
Figure 2:
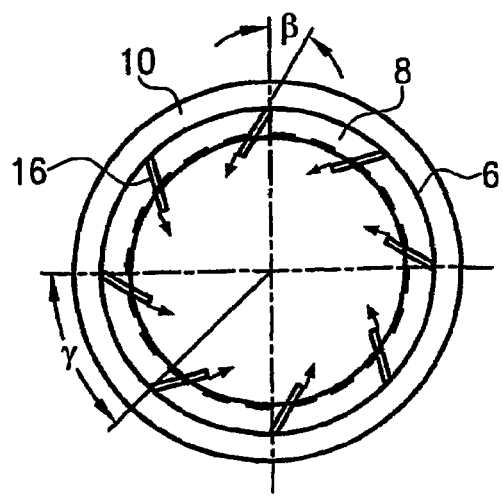
FIG. 2 shows a schematic top view of the area of the inlet openings of the premasher according to FIG. 1.
Figure 3:
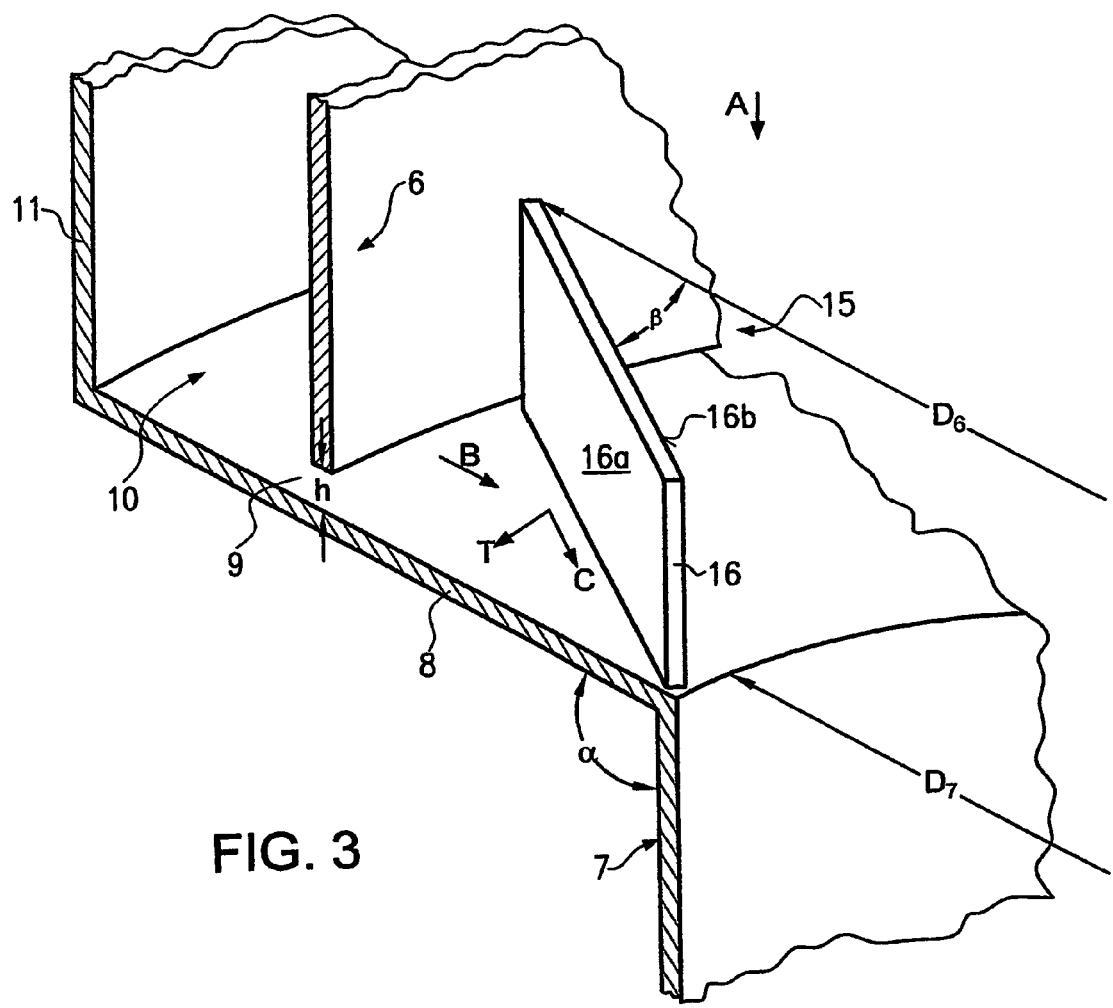
FIG. 3 shows an enlarged detail in the area of the inlet opening of the premasher according to FIG. 1.

FIG. 1 to 3 show a first embodiment of a premasher 1 according to the present invention, comprising a downpipe designated generally by reference numeral 2; the wall 3 of said downpipe 2 is arranged such that its axis 3a extends perpendicular and it is adapted to be connected via a first fastening flange 4 to the discharge pipe of a grist container, a delivery line or the like, and via a second flange 5 to a mash tub in such a way that the grist will fall through the downpipe 2 in a vertical, gravity-conditioned flow A.

The wall 3 of the downpipe 2 comprises an area 6 having a first internal width $D_6$ and defining an upper area when seen in the flow direction A and an area 7 having an internal width $D_7$ and defining a lower area when seen in the flow direction A. $D_6$ is larger than D7 and merges with $D_7$ via a transition surface 8. The transition surface 8 extends obliquely towards the center line 3a at an angle α relative to the flow direction A. The angle α is an angle of approx. 30° to 50°, preferably approx. 40° to 45°.

The area 7 of the wall 3 has a length L which corresponds preferably to at least 2×$D_7$. In said area 7, elements 19 projecting towards the center line 3a and into the flow of material are provided in spaced relationship with the transition surface 8; the purpose for which said elements are used will be explained hereinbelow.

In the preferred embodiment, the areas 6 and 7 have a circular cross-section and consist of commercially available tubular portions, the difference between the internal tube diameters of said areas 6 and 7 being preferably standardized.

A gap-shaped inlet opening 9 for mash water opens into the interior of the downpipe 2 at a location between the transition surface 8 and the circumference of the wall 3, said gap-shaped inlet opening 9 extending along the entire circumference of said wall 3. The inlet opening 9 communicates with a water distributing chamber 10 formed by a jacket 11 arranged in said upper area 6 in spaced relationship with the wall 3. The water distributing chamber 10 extends over the whole outer circumference of the wall 3 in said area 6 and over part of the axial length of said area 6. A water supply line 12 opens into the distributing chamber 10.

In the vicinity of the transition between the areas 6 and 7 of the wall 3, a displacer 13 is arranged symmetrically about the center line 3a, said displacer 13 being held by a holding means 14 in the flow path of the grist at a location above the inlet opening 9. The displacer 13 is preferably formed as a flow guide body and, in the embodiment shown, it has the shape of a double cone. By means of said displacer 13, the flow cross-section is reduced to an annular passage before or at the water inlet opening 9, when seen in the flow direction A, and re-enlarged after the water inlet opening 9, said annular passage having the annular width a.

As can especially be seen in FIG. 3, the inlet opening 9 has associated therewith a flow guide means 15 defined, in the present embodiment, by deflector plates 16 which stand on the transition surface 8 end on and which are directed away from the inlet opening 9. The deflector plates 16 can also fulfill the function of a spacer between the area 6 of the wall 3 and the transition surface 8. Each deflector plate 16 comprises two opposed, parallel deflector surfaces 16a and 16b and is arranged in such a way that it projects into the interior of the downpipe 2 and that the deflector surfaces 16a, 16b extend essentially parallel to the flow direction A and include with the diameters $D_6$ and $D_7$, respectively, an angle β. In other words, the deflector plates 16 are arranged such that the deflector surfaces 16a, 16b are located approximately on a spiral surface extending towards the center line 3a; "approximately" means here that the deflector surfaces 16a, 16b themselves need not necessarily be curved, but are preferably straight surfaces. The angle β is preferably an angle of approx. 30°.

By means of the deflector surface 16a, the mash water flowing in direction B through the inlet opening 9 and onto the transition surface 8 is deflected into a direction C parallel to the deflector surface 16a, which has a tangential component T. This has the effect that the mash water is forced into a kind of rotation path and generates turbulences which markedly improve the mixing ratio between grist and mash water.

As can especially be seen in FIG. 2, the flow guide means 15 comprises a plurality of deflector plates 16 which are distributed around the annular gap-shaped inlet opening 9, preferably at regular angular intervals 6 of preferably 45°. The second deflector surface 16b of the deflector plate 16 decelerates the tangential or circumferential movement of the incoming water and deflects said water again towards the center line 3a.

Due to the fact that the transition surface 8 is inclined at the angle α, also said transition surface 8 acts as a deflector surface with a radial component so that the mash water will reliably arrive at the interior of the downpipe 2.

The generation of these turbulences is additionally supported by an inlet opening 9 which is implemented as a nozzle, i.e. which has a suitably reduced size h, in this case a reduced gap width, which guarantees that the speed of the water introduced will increase above the normal average speed of 2 m/s.

In the upper area 6 of the downpipe 2, an additional connection 17 is provided, which is implemented as a conventional spray-type cleaning head, but which is also able to supply water into the interior of the grist stream in the vicinity of the center line 3a thereof.

When the premasher 1 according to the present invention is in operation, the grist falls in a constant stream in the direction of the arrow A through the downpipe 2 and hits against the displacer 13. The displacer 13 deflects the grist stream in the direction of the transition surface 8 and in the direction of the water inlet opening 9. By means of said water inlet opening 9 and by means of the transition surface 8, which is implemented as a deflector surface, and the deflector surfaces 16a, 16b, the mash water is fed at an increased speed in such a way that turbulences are formed, said turbulences guaranteeing that the grist and the mash water will be thoroughly mixed. Simultaneously, a certain rotational movement is generated, which will continue when the mixture of grist and mash water enters the second area 7 having a reduced diameter. Due to the longer length L and the smaller diameter, said second area 7 acts as a mixing path that intensifies the mixing, and due to the plates 19, which act as rotation interference elements, a substantially laminar flow is re-established. The reduced interior width will additionally cause an increase in speed and, consequently, a decrease in pressure. Hence, a certain suction effect is produced, which is intensified still further by the displacer 13 arranged directly in front of the inlet opening 9. The grist entering the mash tub will then be a grist which has already been thoroughly mixed with water and which will neither make dust nor tend to clot.

Figure 4:
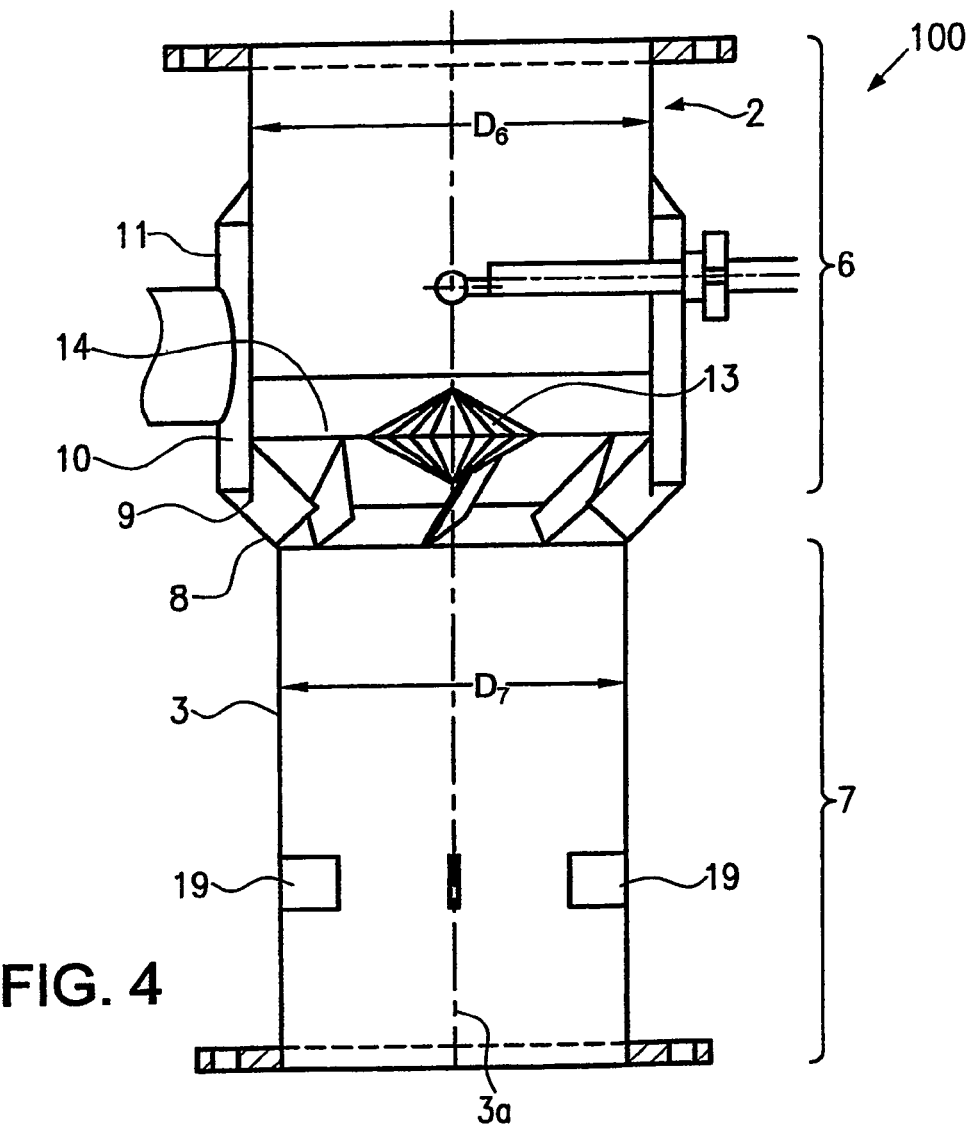
FIG. 4 shows a schematic representation of a second embodiment of a premasher according to the present disclosure in a longitudinal section.
Figure 5:
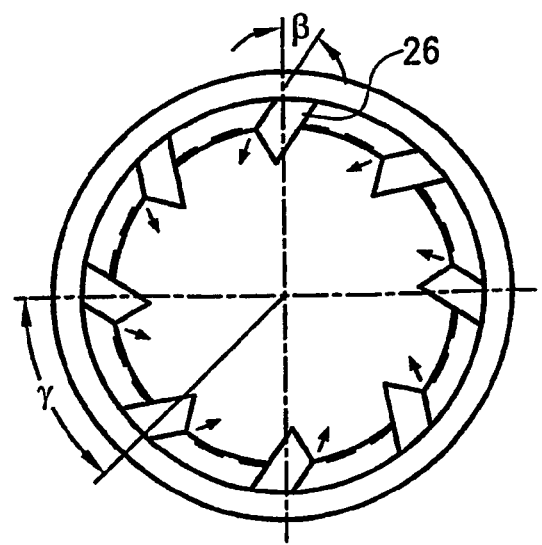
FIG. 5 shows a representation, similar to FIG. 2, of the premasher according to FIG. 4.
Figure 6:
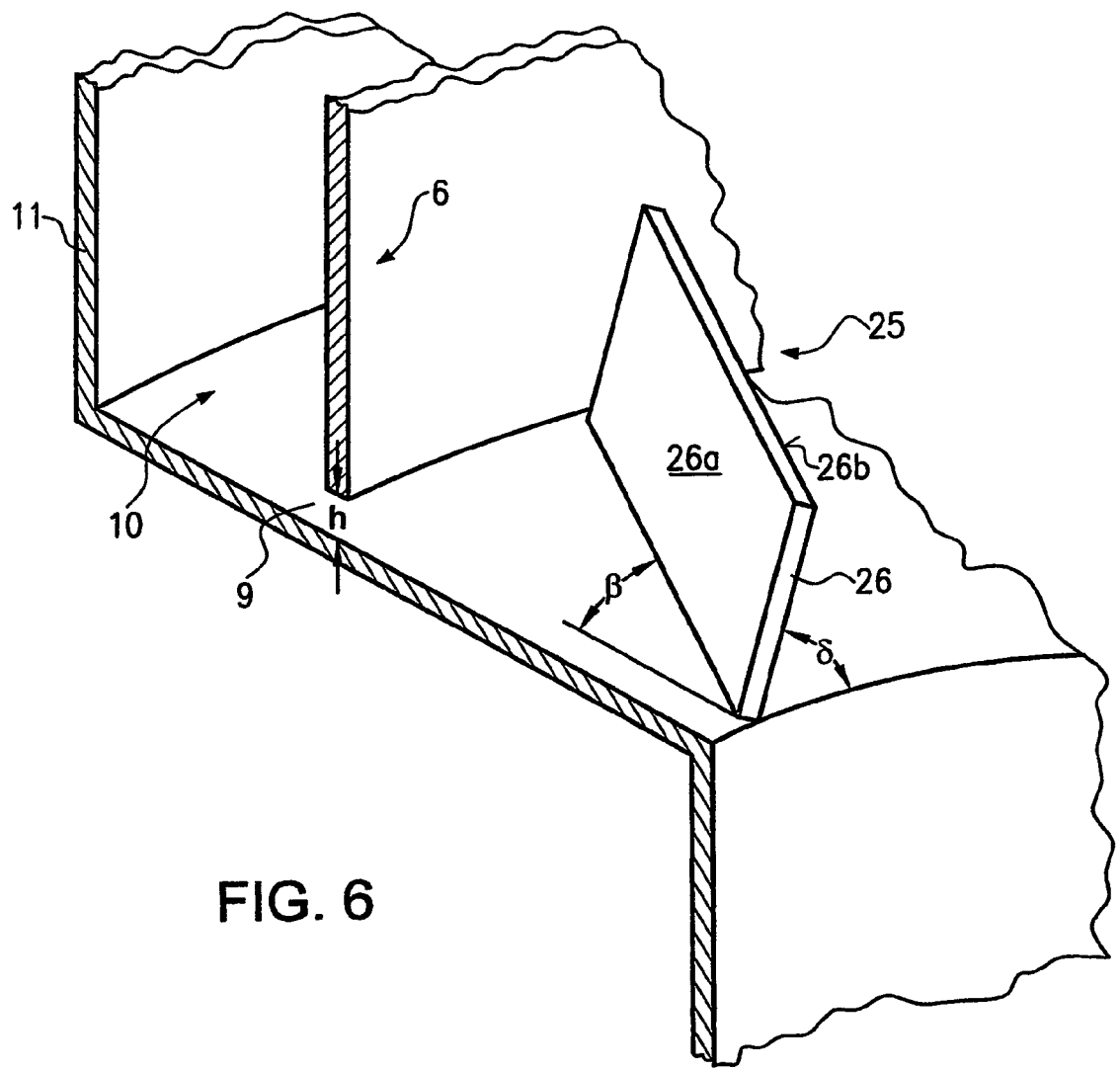
FIG. 6 shows an enlarged detail in the area of the inlet opening of the premasher according to FIG. 4.

FIG. 4 to 6 show a further embodiment of a premasher 100 according to the present invention, which, with the exception of the details described hereinbelow, is identical with the premasher 1 according to FIG. 1; identical or comparable components are designated by identical reference numerals and are not explained once more.

The premasher 100 differs from the premasher 1 insofar as the flow guide means 25 has been modified in comparison with the flow guide means 15. However, also the flow guide means 25 comprises a plurality of deflector plates 26 having two deflector surfaces 26a, 26b which are arranged in parallel. Also the deflector surfaces 26a, 26b are tilted by the angle β relative to the radial direction, but they are additionally inclined by the angle δ relative to the horizontal. It follows that the deflector surfaces 26a, 26b are located approximately on a spiral conical surface around the center line 3a, the tip of said conical surface being directed upwards. "Approximately" means here that the deflector surfaces 26a, 26b do not follow the curvature of the spiral conical surface, but extend along a straight line.

The effect produced by the flow guide means 25 is comparable to that produced by the flow guide means 15, the difference being that, due to the inclination at the angle δ, the mash water will be spread more widely and bind dust particles, which are already present in the downpipe 2, at an early stage, the grist being also deflected from the flow direction A with a tangential component about the center line 3a, and this will, especially in the case of certain grist grades, support turbulence formation and thorough mixing.

As modifications of the embodiments described and shown hereinbefore, the turbulences can also be obtained by other measures which are known to cause turbulence flows. In addition, the tangential component can also be produced in that the inlet opening for the mash water is arranged at an oblique angle. When deflector surfaces are used for a change of direction of the mash water stream, said deflector surfaces can be provided on a great variety of deflector bodies and, in addition to the flat deflector surfaces described, curved or angled deflector surfaces may be used as well.

The invention claimed is:

1. A premasher for beer brewing processes, comprising a downpipe for a stream of grist and an inlet opening for mash water, which opens into said downpipe at the periphery of the stream of grist, the premasher contains a turbulence-generating flow guide means arranged within the stream of grist such that the mash water escaping the inlet opening is deflected by means of the flow guide means with a tangential component with respect to the periphery of the stream of grist, wherein upstream of the inlet opening, the downpipe has a larger interior width than the smaller interior width that is downstream of the inlet opening, and wherein a deflector surface implemented as a transition surface from the larger interior width to the smaller interior width.

2. A premasher according to claim 1, wherein the flow guide means includes an additional deflector surface which is associated with the inlet opening and which extends into the interior of the stream of grist and deflects the mash water with a tangential component.

3. A premasher according to claim 2, wherein the additional deflector surface is located approximately on a spiral surface extending around a center and parallel to the flow direction of the stream of grist.

4. A premasher according to claim 2, wherein the additional deflector surface is located approximately on a spiral conical surface extending around a center of the stream of grist.

5. A premasher according to claim 1, wherein the inlet opening is implemented as a nozzle so as to increase the mash water speed above an average speed of approximately 2 m/s.

6. A premasher according to claim 1, wherein the inlet opening has associated therewith a displacer for the stream of grist, the displacer being arranged in the interior of the downpipe.

7. A premasher for beer brewing processes, comprising a downpipe for a stream of grist and an inlet opening for mash water, which opens into said downpipe at the periphery of the stream of grist, the premasher contains a turbulence-generating flow guide means arranged within the stream of grist such that the mash water escaping the inlet opening is deflected by means of the flow guide means with a tangential component with respect to the periphery of the stream of grist, wherein upstream of the inlet opening, the downpipe has a larger interior width than the smaller interior width that is downstream of the inlet opening, and a mixing path provided in the downpipe downstream of the inlet opening, the length of the mixing path corresponding to approximately twice the smaller interior width.

8. A premasher according to claim 7, and rotation interference elements are arranged on the mixing path.

9. A premasher for beer brewing processes, comprising a downpipe for a stream of grist and an inlet opening for mash water, which opens into said downpipe at the periphery of the stream of grist, the premasher contains a turbulence-generating flow guide means arranged within the stream of grist such that the mash water escaping the inlet opening is deflected by means of the flow guide means with a tangential component with respect to the periphery of the stream of grist, wherein the downpipe has a wall which comprises a first area, which has a first internal width and which defines an upstream area when seen in the flow direction of the grist, a second area, which has a second, smaller internal width and which defines a downstream area, and an annular transition surface, which is implemented as a deflector surface and which is provided between the first and second areas and inclined radially inwards in the flow direction of the stream of grist, and wherein the inlet opening for the mash water is implemented as an annular gap extending through the wall and opens into the downpipe at the upstream end of the transition surface, and a plurality of spaced-apart deflector plates is arranged at the inlet opening, each of the deflector plates being provided with a deflector surface deflecting the mash water with a tangential component.

10. A premasher according to claim 9, wherein the flow guide means is provided with a second deflector surface associated with the inlet opening and used for deflecting the mash water with a radial component with respect to a center of the stream of grist.

11. A premasher according to claim 9, wherein upstream of the inlet opening, the downpipe has a larger interior width than the smaller interior width that is downstream of the inlet opening.

* * * * *

UNITED STATES PATENT AND TRADEMARK OFFICE
CERTIFICATE OF CORRECTION

PATENT NO. : 7,484,453 B2　　　　　　　　　　　　　　　　　　　　　Page 1 of 1
APPLICATION NO. : 10/501436
DATED : February 3, 2009
INVENTOR(S) : Helmut Kammerloher It is certified that error appears in the above-identified patent and that said Letters Patent is hereby corrected as shown below:

On the Title Page

Item (54), "PRE-MASHER" should be -- PREMASHER --.

Item (30), "02001698" should be -- 02001698.6 --.

At Column 1, line 1, "PRE-MASHER" should be -- PREMASHER --.

Signed and Sealed this

Second Day of June, 2009

JOHN DOLL
*Acting Director of the United States Patent and Trademark Office*